United States Patent
Brady et al.

(10) Patent No.: US 6,923,369 B2
(45) Date of Patent: Aug. 2, 2005

(54) METHOD AND APPARATUS FOR USE OF IDENTIFICATION CARDS WITH RESTRICTED INFORMATION CARDS WITH RESTRICTED INFORMATION FOR IDENTIFICATION WITHOUT VIOLATING THE RESTRICTIONS

(75) Inventors: James T. Brady, San Jose, CA (US); Anthony A. Shah-Nazaroff, Santa Clara, CA (US)

(73) Assignee: Forecourt Communication Group, San Jose, CA (US)

( * ) Notice: Subject to any disclaimer, the term of this patent is extended or adjusted under 35 U.S.C. 154(b) by 0 days.

(21) Appl. No.: 10/611,017

(22) Filed: Jul. 1, 2003

(65) Prior Publication Data

US 2004/0074962 A1 Apr. 22, 2004

Related U.S. Application Data

(60) Provisional application No. 60/397,046, filed on Jul. 19, 2002.

(51) Int. Cl.$^7$ .................................................. G06K 5/00
(52) U.S. Cl. ...................... 235/380; 235/449; 235/451; 235/487; 235/380; 235/382.5
(58) Field of Search ................................ 235/380, 379, 235/382.5, 383, 449, 451, 487; 340/5.1, 5.2

(56) References Cited

U.S. PATENT DOCUMENTS

| | | | | |
|---|---|---|---|---|
| 3,869,700 | A | * 3/1975 | Cook et al. | 235/380 |
| 4,912,310 | A | * 3/1990 | Uemura et al. | 235/380 |
| 5,878,137 | A | * 3/1999 | Ippolito et al. | 713/172 |
| 6,149,055 | A | * 11/2000 | Gatto | 235/379 |
| 6,527,173 | B1 | * 3/2003 | Narusawa et al. | 235/380 |
| 2003/0121969 | A1 | * 7/2003 | Wankmueller | 235/379 |

* cited by examiner

*Primary Examiner*—Steven S. Paik
(74) *Attorney, Agent, or Firm*—Ohlandt, Greeley, Ruggiero & Perle, L.L.P.

(57) ABSTRACT

A system and method for constructing an ID code for a loyalty program from non-restricted information from a payment card or other ID card having restricted information.

23 Claims, 4 Drawing Sheets

| Field Name | ID # |
|---|---|
| Format Code | 400 |
| Account Code | 401 |
| Country Code | 402 |
| User Name | 403 |
| Expiration Date Year | 404 |
| Expiration Date Month | 405 |
| Optional Data | 406 |
| LRC | 407 |

Fig. 4

| Field Name | Rows in Data Table | | | ID # |
|---|---|---|---|---|
| User ID | | ... | | 500 |
| User Name | | ... | | 501 |
| Loyalty Program Data | | ... | | 502 |

Fig. 5

METHOD AND APPARATUS FOR USE OF IDENTIFICATION CARDS WITH RESTRICTED INFORMATION CARDS WITH RESTRICTED INFORMATION FOR IDENTIFICATION WITHOUT VIOLATING THE RESTRICTIONS

This application claims benefit of 60/397,046, filed Jul. 19, 2002.

FIELD OF THE INVENTION

The present invention generally relates to the use of an identification (ID) card issued for another purpose as the ID for a Loyalty program. Many ID cards, such as payment cards, have restrictions on the use of the "account number" or "account code" that prevent a merchant who is accepting payment card from using the Account Code for any purpose other than payment.

BACKGROUND OF THE INVENTION

With the advent of permission-based marketing, loyalty programs, and other marketing approaches that use the customer's identification card to trigger the promotions to the customer, it has been demonstrated that the more information collected about the customer, the more successful the promotion. Additionally, if frequent customers are rewarded by these systems, the loyalty of the customer is improved, resulting in increased business for the merchant. Since one of the most significant expenses related to setting up of a loyalty program is the issuance of IDs to the customers, the cost of the setup will not proportionate to the size of the merchant. This discourages small merchants from using loyalty programs as marketing tools.

A second problem is that existing loyalty programs have found that the customers dislike systems where two cards must be "swiped" in order to complete a transaction. Thus, loyalty programs based on both an ID card and a separate payment card have proven to be less successful than ones based on a combined payment card/loyalty card, like those issued by some petroleum companies.

The use of various bankcards has come into common use for payment of transactions. These bankcards are scanned at the point of sale. They contain a unique identifier for the user. These identifiers are variously called "Account Code", "account number" or another name. The term "Account Code" will be used herein to mean any of these, as there is no need that the Account Code be strictly numeric. Unfortunately, some of the fields have restricted use, namely the unique identifier Account Code. Other items encoded on the card are not restricted, but are not unique.

The present invention uniquely uses the non-restricted information to develop a customer ID that has a low probability of having duplicates, such that the customer ID can be used in a loyalty program, thereby reducing the cost of the deployment of a loyalty program.

SUMMARY OF THE INVENTION

A second ID for the user of ID cards having restriction on the use of the Account Code in a manner such that the second ID code has a lower probability of being duplicated in the retail store than an ID code derived from the Card Holder Name field.

The present invention associates the derived ID code used by an entity to that entity, based on the information extracted from the cards.

A system in the form of programming instructions and computing equipment embodied in one or more servers and peripheral equipment, that provides a loyalty program to customers of a retail store. This system provides for the following: definition of rules for extraction of unrestricted information from ID cards, a synthesis means for converting the extracted information into a second ID code, and a database means for storing the results of the correlation.

When the system is running a control mechanism extracts the unrestricted information from the ID card, constructs the second ID code, and uses the second ID code to access the loyalty program for the retail location where the ID card has been used.

BRIEF DESCRIPTION OF THE DRAWINGS

FIG. 4 is a data table that describes an Identification Card.

FIG. 5 is a data table that describes the User Table.

DETAILED DESCRIPTION OF THE PREFERRED EMBODIMENT

Figure 1:
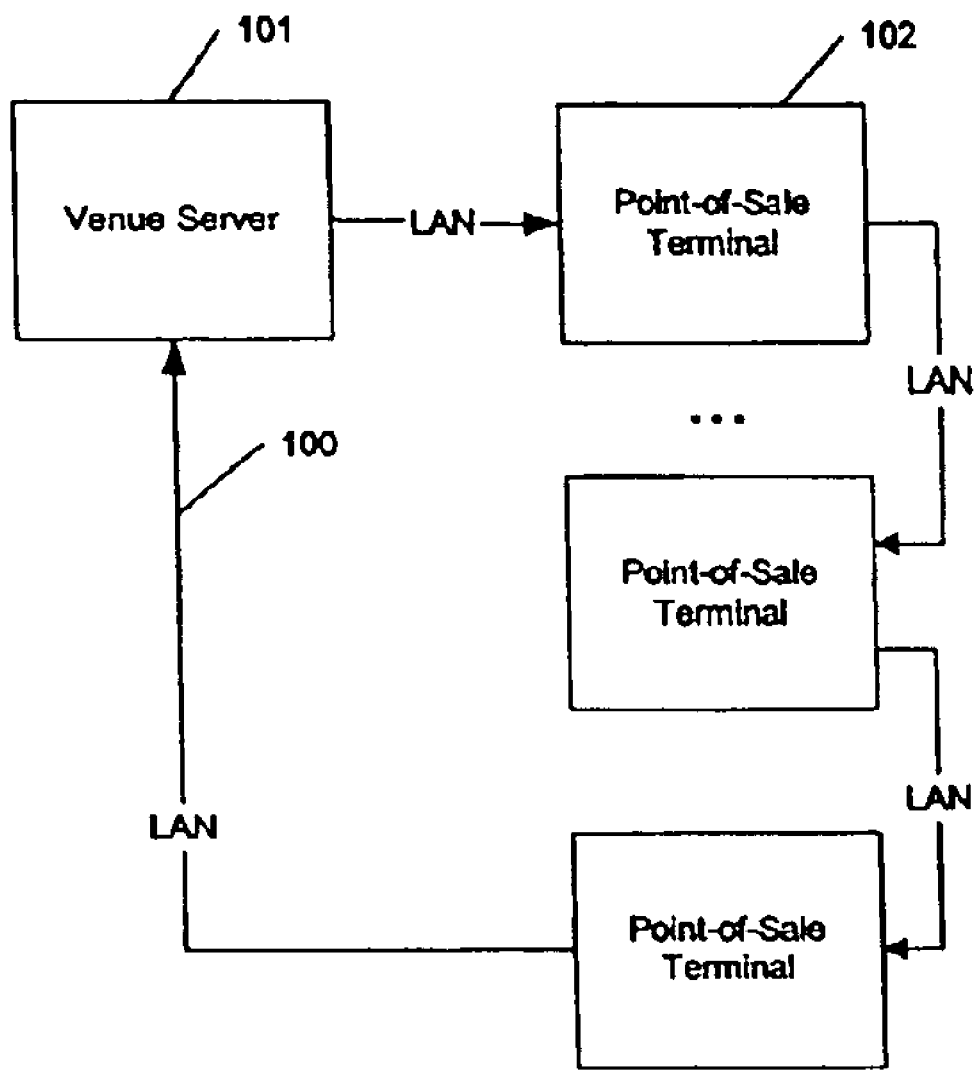
FIG. 1 is a diagram of a computer System, which is adapted to perform the method of the invention.

FIG. 1 is a diagram of a network of computers adapted to perform the method of the invention. Venue Server 101 is connected via LAN 100 to one or more Point-of-Sale Terminals 102. Normal Point-of-Sale Terminal activities are conducted between the Venue Server 101 and Point-of-Sale Terminal 102.

In a retail store, there is a Venue Server 101 coordinating the activities of one or more Point-of-Sale Terminals 102, which are used to process customer transactions. When a loyalty program is implemented the Venue Server 101 maintains records of the customer and the rewards that customer is due. When the customer is identified at the Point-of-Sale Terminal 102 by reading a payment card or other ID card, the system described herein, uses the information in the card to produce a User ID 500 (See FIG. 5, User Table) from the information in the identification card (See FIG. 4, Identification Card), using a set of transforms described in FIG. 6, ID Construction Routine and FIG. 7, Transform Routine.

Figure 2:
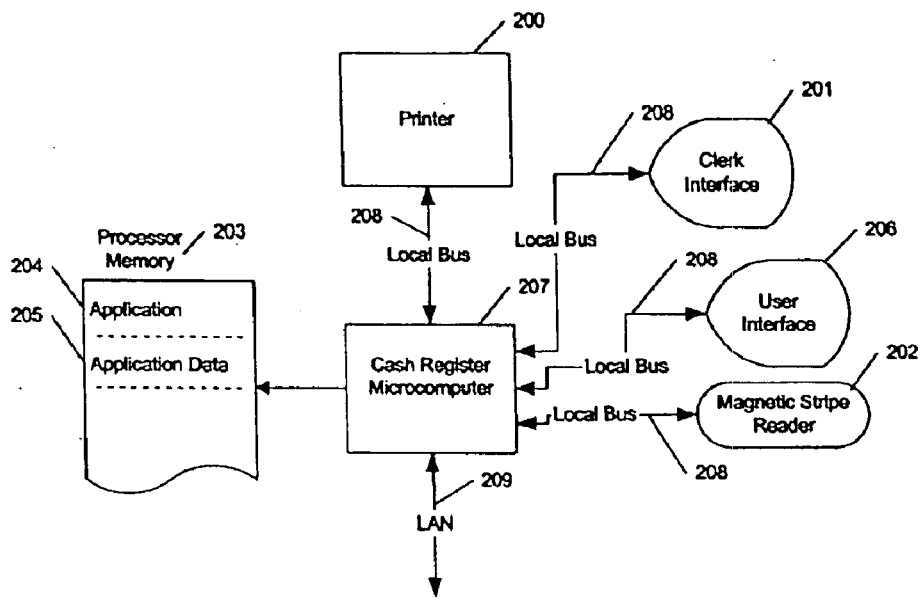
FIG. 2 is a diagram of a computer system representative of a Point-of-Sale Terminal.

FIG. 2 is a diagram of a Point-of-Sale Terminal seen in FIG. 1. Point-of-Sale Terminals are configured using a Cash Register Microcomputer 207 of conventional design. Attached to the Cash Register Microcomputer 207 are various input and output devices including: a LAN 209, Printer 200, Clerk Interface 201, User Interface 206, and Magnetic Stripe Reader 202. The Clerk Interface 201 is normally involved with checkout processing. Output device, Printer 200, is for hardcopy printouts such as receipts, advertisements, coupons, and other information. These are attached via electronic Local Bus 208 links, which normally are serial IO like an RS232 serial port. Magnetic Stripe Reader 202 reads the user ID card and provides the contents to Application 310 in FIG. 3, Venue Server, which performs the method of this invention as described in FIG. 7, Construction of User ID. Processor Memory 203 contains Application 204 and Application Data 205 needed to run FIG. 2, Point-of-Sale Terminal.

During the course of the customer's transaction, the customer swipes a payment card or other identification card in Magnetic Stripe Reader 202. This information travels by way of Local Bus 208 to the Cash Register Microcomputer 207 to the Venue Server 101 where it is processed as described above. The Loyalty Application communicates with the customer using User Interface 206 and Printer 200.

The Clerk Interface 201 is present in attended retail checkout stations, such as is found in grocery stores, pharmacies, and convenience stores. It is not present, nor is it required by this invention, in unattended environments, such as gas dispensers, ATMs, or self-checkout grocery stations.

Figure 3:
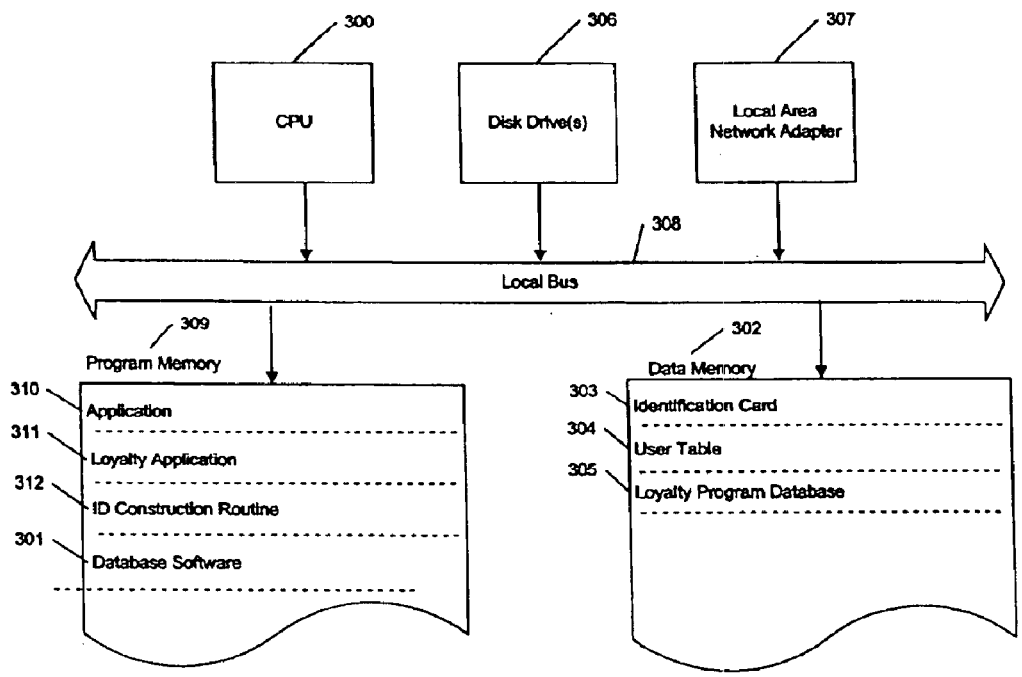
FIG. 3 is a diagram of a computer system called the Venue Server.

FIG. 3 depicts venue server 101 from FIG. 1. Venue server 101 is described as though it is implemented as a separate computer system; however, the function provided can be performed by other computer systems in the venue or remotely from the venue via communications lines. CPU 300 controls the various components by the logic described in the programs in Program Memory 309. Internally various components communicate via Local Bus 308. Tables and databases are in Data Memory 302. These are stored on Disk Drive(s) 306 for long-term storage. The tables used are: Identification Card 303 (described in FIG. 4, Identification Card) and User Table 304 (described in FIG. 5, User Table). Additionally, there is the data required for the Loyalty Application 311, which is stored in Loyalty Program Database 305, which is dependent on the loyalty program for its format. Application 310, in Program Memory 309, makes use of commercially available Database Software 301 to provide storage, selection and retrieval functions that it needs to perform the store functions.

During the course of Point-of-Sale transactions the users Identification Card information is captured and Application 310 routes that information to Loyalty Application 311, initiating processing of the application. Loyalty Application 311 subsequently uses ID Construction Routine 312 to build the User ID 500, which is used by the Loyalty Application 311 to access FIG. 5, User Table, enabling the loyalty program's function. While this embodiment is in the context of a loyalty program, it works equally well for any application that needs to use an ID and has access to the information on a user identification card that was not intended to be used with that application, and has restrictions on the use of some of the data on the ID card.

Venue server 101 also communicates via Local Area Network Adapter 307 to LAN 100 in FIG. 1 and other components of the system.

FIG. 4 is the Identification Card. It contains Format Code 400 that is used to distinguish the card format. In this embodiment it contains a "B", which indicates the following format: Account Code 401 that is up to 19 characters in length, Country Code 402 that is three characters, User Name 403 that is from 2 to 26 characters long, Expiration Date Year 404 that is two characters in YY format, Expiration Date Month 405 that is two characters in MM format, Optional Data 406 that is enough to fill out a maximum track length of 79 characters, and LRC 407. These are read from the users Identification Card. Some possible types of Identification Cards are Credit, Debit, ATM, and Loyalty cards. In this embodiment, the format shown is extracted from the ISO/IEC standard 7811; however, any standard that can be distinguished from the ISO/IEC standard by using Format Code 400 can be used. Other embodiments could use any well-defined format to accomplish the same effect.

Figure 6:
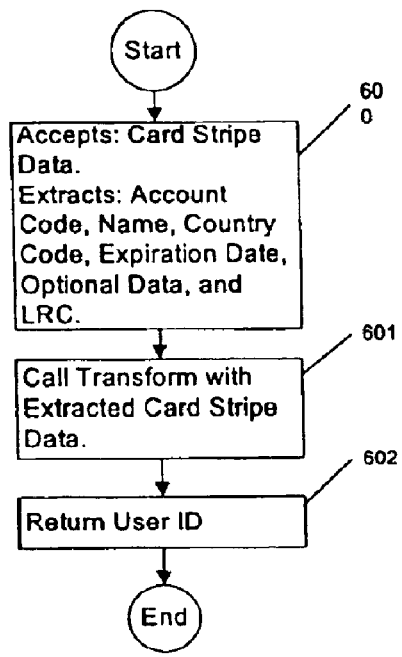
FIG. 6 is the ID Construction Routine.

FIG. 5 illustrates User Table that contains a User ID 500 which is the ID used in the Loyalty Application 311 and is generated by FIG. 6 ID Construction Routine. It also contains User Name 501, which is extracted from FIG. 4, Identification Card, and Loyalty Program Data 502, which is specific to the loyalty program implementation and is not described herein.

FIG. 6, ID Construction Routine starts with control in Step 600 which accepts the previously read card stripe information as in FIG. 4, Identification Card and extracts the Account Code 401, User Name 403, Expiration Date Month 405, Optional Data 406 and LRC 407. It then passes control to Step 601.

Figure 7:
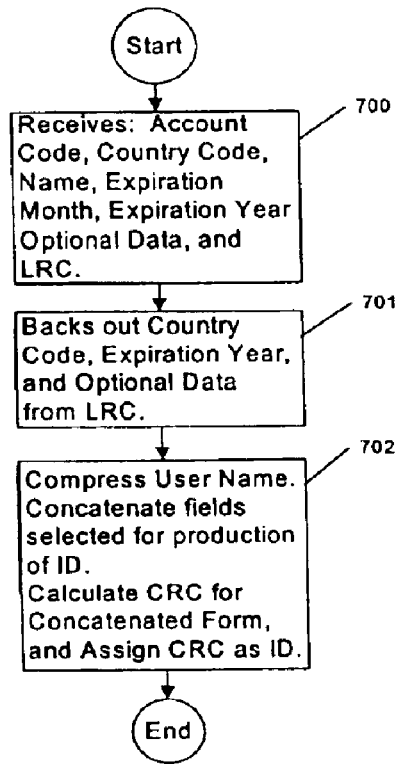
FIG. 7 is a diagram of the Transform Routine.

Step 601 calls the FIG. 7, Transform Routine to produce an intermediate form of the desired User ID 500, and then passes control to Step 602, which passes the final form of User ID 500 to the requesting program. In this case it would be a loyalty program, but in other embodiments it would be returned to other applications.

FIG. 7 illustrates details of the Transform Routine, which is entered at Step 700 and accepts the Account Code, Country Code, Name, Expiration Month, Expiration Year, Optional Data, and LRC from the calling routine.

Control then passes to Step 701, which backs out the data that is not preserved when a card is reissued or renewed. That data is normally the Country Code, Expiration Year, and Optional Data. The back-out is performed using the inverse operation that was used to compute the LRC 407. In this embodiment an Exclusive-Or is used. The control passes to Step 702.

Step 702 compresses User Name 403 into a dense code using a Huffman code producing a compressed user name. In other embodiments other compression algorithms may be used, including not compressing the field. Next the compressed user name and the fields selected to contribute information to the User ID 500 (Expiration Date Month 405, and LRC 407) are concatenated, and a CRC is calculated over the concatenated data, yielding a number that is used as the User ID 500. In other embodiments various combinations of the FIG. 4, Identification Card fields and sub-fields can be used to implement the invention. An example of a sub-field would be the use of the first 8 digits of the Account Code 401, as would be allowable when the restriction on the use of Account Code 401 applies only when the entire Account Code 401 can be reconstructed from the derived field or fields. Additional, other embodiments can use methods other than a CRC calculation to produce a User ID 500 that contains information from all the data elements used to produce it. Some algorithms suitable are: Universal Hash algorithms, encryption, arithmetic folding, and division using the remainder as the ID.

What is claimed is:

1. A system for reliably identifying the holder of an ID card using only non-restricted information on said ID card, said ID card having a restricted first ID code, the system comprising:

a means to acquire information from said ID card upon each cardholder use of said ID card, said information comprising two or more fields including said cardholder name field; and a means to construct a second ID code that is not stored on said ID card from said information acquired upon each use of said ID card, wherein said second ID code has a probability of duplicating another second ID code constructed from another cardholder's ID card that is less than the probability that the holder name information on said ID card duplicates the holder name information on said other cardholder's ID card.

2. A system as in claim 1 where said information used to construct said second ID code further comprises said ID card's expiration date.

3. A system as in claim 1, where said information used to construct said second ID code further comprises said ID card's optional data field.

4. A system as in claim 1, where said information used to construct said second ID code further comprises said ID card's longitudinal redundancy check field (LRC) field modified by backing out information that changes when a card is renewed or reissued.

5. A system as in claim 1, where said information used to construct said second ID code further comprises said ID card's account code field modified by coding into a form that cannot be used to reconstruct said Account Code.

6. The system of claim 1 wherein said information is acquired from at least one magnetic track on said ID card.

7. A computer-implemented method for reliably identifying the holder of an ID card using only non-restricted information on said ID card, said ID card having a restricted first ID code, the method comprising:
  acquiring information from said ID card upon each cardholder use of said ID card, said information comprising two or more fields including said cardholder name field; and
  constructing a second ID code that is not stored on said ID card from said information acquired upon each use of said ID card, wherein said second ID code has a probability of duplicating another second ID code constructed from another cardholder's ID card that is less than the probability that the holder name information on said ID card duplicates the holder name information on said other cardholder's ID card.

8. The system of claim 1 wherein said ID card is a payment card.

9. The system of claim 1 wherein said ID card is in an industry-standardized format.

10. The system of claim 1 wherein said means to acquire information comprises a point of sale terminal of a store, and wherein said means to construct said second ID code comprises a server system of said store.

11. The method of claim 7 wherein said information used to construct said second ID code further comprises one or more fields of said ID card selected from the group consisting of: an expiration date field, an optional data field, a longitudinal redundancy check field (LRC) field that is modified by said step of constructing by backing out information that changes when a card is renewed or reissued, and an account code field that is modified by said step of constructing by coding into a form that cannot be used to reconstruct said account code.

12. The method of claim 7 wherein said information is acquired from at least one magnetic track on said ID card.

13. A system for storing data records reliably associated with the holder of an ID card, the system comprising:
  a reader that acquires information from the ID card upon each cardholder use of the ID card, said information comprising two or more non-restricted fields including said cardholder name field, the ID card having a restricted first ID code;
  a processor that constructs a second ID code not stored on the ID card from the information acquired upon each use of the ID card, wherein the second ID code has a probability of duplicating another second ID code constructed from another cardholder's ID card that is less than the probability that the holder name information on the ID card duplicates the holder name information on the other cardholder's ID card; and
  a data memory that stores data records identified by second ID codes, wherein a data record identified by a particular second ID code concerns the cardholder of the particular ID card from which that particular second ID code is constructed.

14. The system of claim 13 wherein said card reader is operatively connected to a point of sale terminal of a store, and wherein said processor is operatively connected to a server system of the store.

15. The system of claim 14 wherein at least one data record comprises store loyalty program data concerning the cardholder with whom the record is associated.

16. The system of claim 13 wherein said information used to construct said second ID code further comprises one or more fields of said ID card selected from the group consisting of: an expiration date field, an optional data field, a longitudinal redundancy check field (LRC) field that is modified by said processor by backing out information that changes when a card is renewed or reissued, and an account code field that is modified by said processor by coding into a form that cannot be used to reconstruct said account code.

17. The system of claim 13 wherein said information is read from at least one magnetic track on said ID card.

18. A computer-implemented method for providing a customer loyalty program for a store, the method comprising:
  reliably identifying a store customer who holds an ID card by constructing a second ID code from non-restricted information read from said ID card during a transaction of said customer at said store, wherein said ID card comprises a restricted first ID code, and wherein said second ID code has a probability of duplicating another second ID code constructed from another customer's ID card that is less than the probability that customer name information on said ID card duplicates customer name information on said other customer's ID card;
  retrieving from a data memory at least one data record identified by said constructed second ID code, where said retrieved record comprises store loyalty program information concerning said customer; and
  communicating loyalty program information to said customer during said transaction.

19. The method of claim 18 wherein said information read from said customer's ID card comprises customer name information and information from at least one other non-restricted field of said ID card.

20. The method of claim 18 wherein said loyalty program information communicated to said customer comprises rewards due said customer.

21. The method of claim 18 further comprising a step of updating said store loyalty program information concerning said customer with information from said transaction.

22. The method of claim 18 wherein said ID card is a payment card.

23. The method of claim 18 wherein said information used to construct said second ID code further comprises one or more fields of said ID card selected from the group consisting of: an expiration date field, an optional data field, a longitudinal redundancy check field (LRC) field that is modified by said constructing a second ID code by backing out information that changes when a card is renewed or reissued, and an account code field that is modified by said constructing a second ID code by coding into a form that cannot be used to reconstruct said account code.

* * * * *